United States Patent
Zhong et al.

(10) Patent No.: US 9,928,067 B2
(45) Date of Patent: Mar. 27, 2018

(54) METHODS AND SYSTEMS FOR PERFORMING A BINARY TRANSLATION

(71) Applicant: Intel Corporation, Santa Clara, CA (US)

(72) Inventors: Xueliang Zhong, Shanghai (CN); Jianhui Li, Shanghai (CN); Jian Ping Jane Chen, Shanghai (CN); Gang Wang, Shanghai (CN); Yi Qian, Shanghai (CN); Huifeng Gu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 835 days.

(21) Appl. No.: 13/976,359

(22) PCT Filed: Sep. 21, 2012

(86) PCT No.: PCT/CN2012/081728
§ 371 (c)(1),
(2) Date: Jun. 26, 2013

(87) PCT Pub. No.: WO2014/043886
PCT Pub. Date: Mar. 27, 2014

(65) Prior Publication Data
US 2014/0304493 A1    Oct. 9, 2014

(51) Int. Cl.
*G06F 9/30* (2006.01)
*G06F 9/45* (2006.01)
(Continued)

(52) U.S. Cl.
CPC ............ *G06F 9/30181* (2013.01); *G06F 8/52* (2013.01); *G06F 9/3861* (2013.01); *G06F 9/4552* (2013.01)

(58) Field of Classification Search
CPC .................................................. G06F 9/30181
(Continued)

(56) References Cited

U.S. PATENT DOCUMENTS 6,009,512 A * 12/1999 Christie .............. G06F 9/30072
712/218
6,496,922 B1 * 12/2002 Borrill ................ G06F 9/30174
711/3
(Continued)

FOREIGN PATENT DOCUMENTS

CN         101706734 A      5/2010
WO     WO2004/109499       12/2004

OTHER PUBLICATIONS

Intel Corporation, "Intel Itanium Architecture Software Developer's Manual, vol. 3: Intel Itanium Instruction Set Reference". Revision 2.3, May 2010. 7 pages.*
(Continued)

*Primary Examiner* — Andrew Caldwell
*Assistant Examiner* — Michael Metzger
(74) *Attorney, Agent, or Firm* — Alliance IP, LLC

(57) ABSTRACT

Systems and methods are provided in example embodiments for performing binary translation. A binary translation system converts, by a translator module, source instructions to target instructions. The binary translation system identifies a condition code block in the source instructions, where the condition code block includes a plurality of condition bits. In response to identifying the condition code block, the binary translation system provides an optimizer module to convert the condition code block. Then, the binary translation system performs a pre-execution on the condition code block to resolve the plurality of condition bits in the condition code block.

18 Claims, 9 Drawing Sheets

(51) Int. Cl.
*G06F 9/38* (2018.01)
*G06F 9/455* (2018.01)

(58) Field of Classification Search
USPC .................................................. 712/209, 226
See application file for complete search history.

(56) References Cited

U.S. PATENT DOCUMENTS

| | | | |
|---|---|---|---|
| 7,587,582 B1* | 9/2009 | Sudharsanan | G06F 9/3012 708/100 |
| 2004/0109499 A1 | 6/2004 | Cern | |
| 2004/0250051 A1* | 12/2004 | Seal | G06F 9/30072 712/226 |
| 2006/0200654 A1* | 9/2006 | Dieffenderfer | G06F 9/3001 712/226 |
| 2006/0224861 A1* | 10/2006 | Elwood | G06F 9/30072 712/209 |
| 2006/0224867 A1* | 10/2006 | Tran | G06F 9/30072 712/226 |
| 2007/0260855 A1* | 11/2007 | Gschwind | G06F 9/30014 712/213 |
| 2008/0172657 A1 | 7/2008 | Bensal et al. | |
| 2008/0172661 A1 | 7/2008 | Chatterjee et al. | |
| 2010/0115247 A1* | 5/2010 | Lopez | G06F 11/3419 712/226 |
| 2011/0066829 A1* | 3/2011 | Tye | G06F 8/4441 712/226 |
| 2011/0307876 A1 | 12/2011 | Ottoni et al. | |
| 2012/0124346 A1* | 5/2012 | Hardage | G06F 9/30072 712/239 |

OTHER PUBLICATIONS

Yasuhiko Nakajima, et al., "The M-architecture Emulation Based on Dynamic Code Translation", Transactions of Information Processing Society of Japan, Nov. 15, 1997, vol. 38, No. 11, p. 2309-2320 [Abstract Only Translation].

Japan Patent Office Notification of Decision of Refusal in Japanese Patent Application Serial No. 2014-536101 dated Nov. 11, 2014.

Korean Patent Office Notice of Preliminary Rejection in Korean Patent Application 10-2013-7023094 dated Oct. 29, 2015 [No translation].

International Search Report and Written Opinion received for PCT Patent Application No. PCT/CN2012/081728, dated Jun. 27, 2013, 14 pages.

* cited by examiner

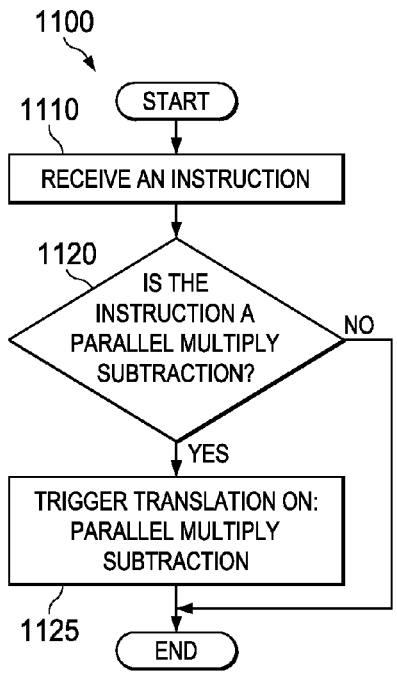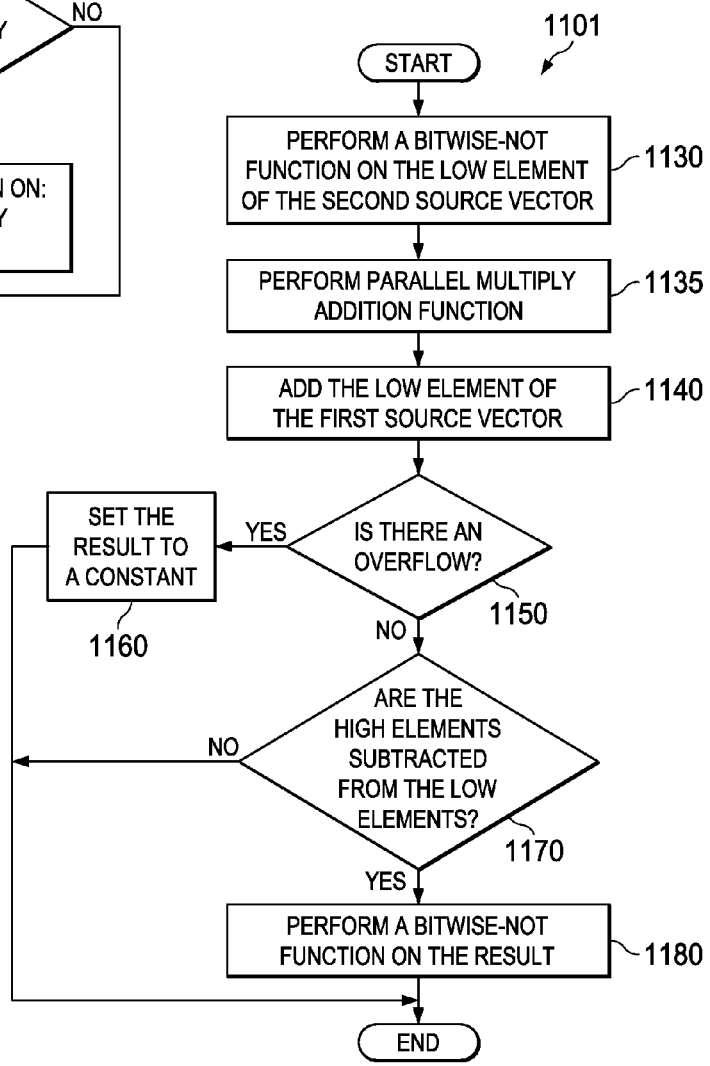
FIG. 11A
FIG. 11B

METHODS AND SYSTEMS FOR PERFORMING A BINARY TRANSLATION

TECHNICAL FIELD

This disclosure relates in general to the field of binary translation and, more particularly, to executing instructions involving binary translation.

BACKGROUND

Binary translation is a high performance emulator that allows an application, compiled for one instruction set architecture (referred to herein as a "source ISA") to run on a different ISA (referred to herein as a "target ISA"). Essentially, binary translation (BT) is a general technique to translate binaries built for one source ISA to another target ISA. Accordingly, by using binary translation, it is possible to execute application binaries built for one processor ISA on a processor with a different architecture, without recompiling high-level source code or rewriting assembly code. Since many legacy computer applications are available in binary formats, binary translation is very attractive due to its potential to allow a processor to execute applications that are not built and available for it.

Generally, binary translation systems follow the same basic execution flow. First, a binary file created for the source architecture is loaded into memory. Sections of this source binary are then translated into target binary code. This translation is typically done "on-demand". In other words, the source-code instructions are translated as the flow of control reaches them. Typically, the translation is performed at the granularity of basic blocks, which are sequences of instructions with a single entry and potentially multiple exits. Once a basic block is translated, the translation is kept in a translation cache (also referred to herein as "code cache") in memory for future reuse.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 8 is a simplified flowchart illustrating a method for binary translation by a binary translation system with a condition state recovery table in accordance with an embodiment;

FIG. 11A is a simplified flowchart illustrating a method for identifying a parallel-multiply-subtraction instruction in accordance with an embodiment;

FIG. 11B is a simplified flowchart illustrating a method for binary translation with a parallel-multiply-subtraction instruction in accordance with an embodiment;

DETAILED DESCRIPTION OF EXAMPLE EMBODIMENTS

Example Embodiments

Figure 1:
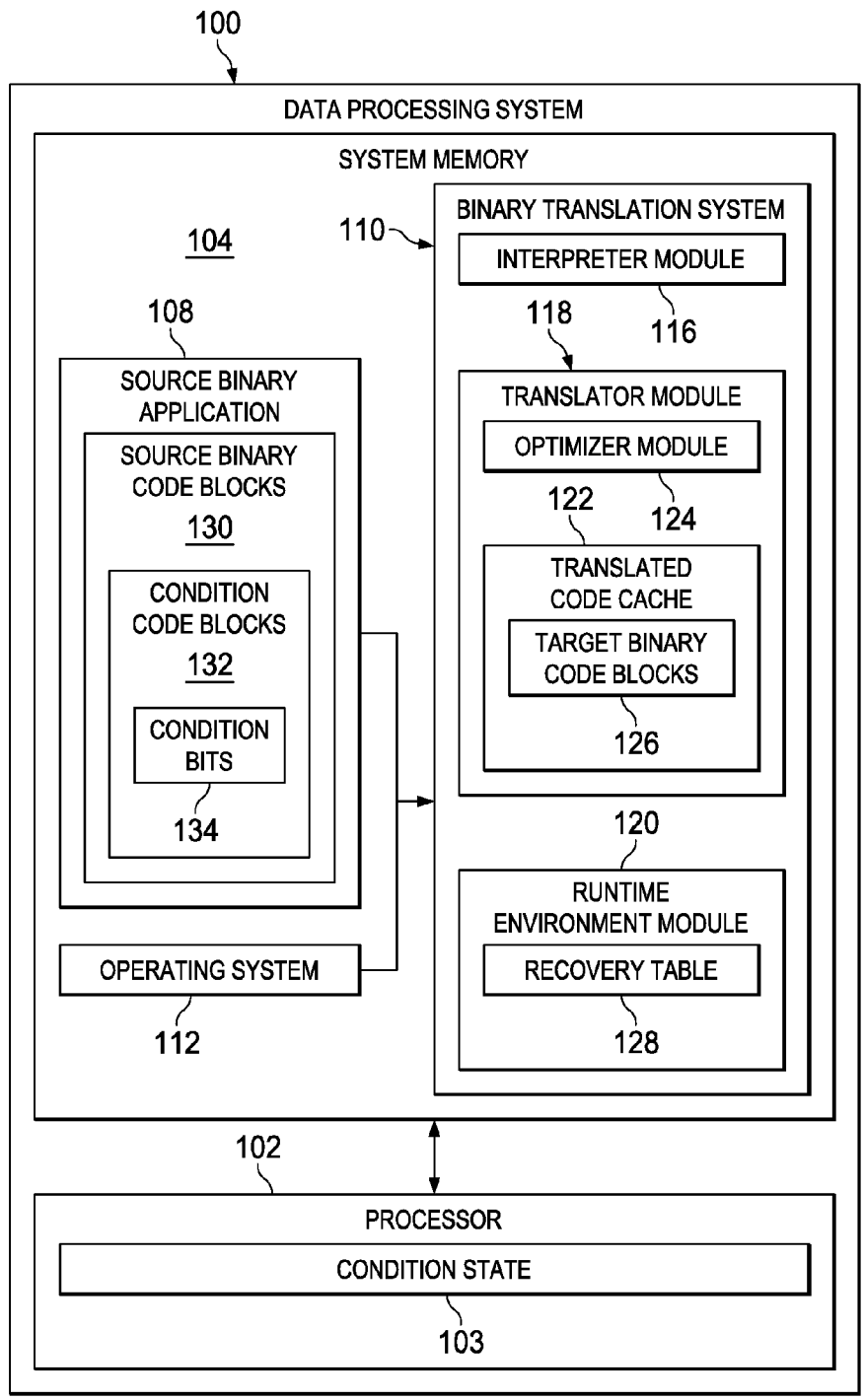
FIG. 1 is an example illustration of a data processing system in accordance with an embodiment.

FIG. 1 is an example illustration of a data processing system in accordance with an embodiment. Data processing system 100 includes a processor 102 coupled to a system memory 104. Processor 102 may include a condition state 103. System memory 104 may include a source binary application 108, binary translation system 110, and an operating system 114. Binary translation system 110 may include an interpreter module 116, a translator module 118, and a runtime environment module 120, which can be implemented in software, hardware, firmware, or any suitable combination thereof. Translator module 118 may include a translated code cache 122 and an optimizer module 124. Additionally, translated code cache 122 may include target binary code blocks 126. Runtime environment module 120 may include a recovery table 128. Source binary application 108 may include source binary code blocks 130. Source binary code blocks 130 may include condition code blocks 132. Further, condition code blocks 132 may include condition bits 134. For ease of reference, source binary code blocks 130, target binary code blocks 126, and condition code blocks 132 may be referred to herein in singular form, when appropriate for explanation.

Processor 102 serves to execute instructions for software that may be loaded into system memory 104. Processor 102 may be a number of processors, a multi-processor core, or some other type of processor, depending on the particular implementation. A number, as used herein with reference to an item, means one or more items. Further, processor 102 may be implemented using a number of heterogeneous processor systems in which a main processor is present with secondary processors on a single chip. As another illustrative example, processor 102 may be a symmetric multi-processor system containing multiple processors of the same type. The translator module 118 may be executed by one or more cores of processor 102 to transform source binary code blocks 130 into target binary code blocks 126.

System memory 104 is an example of a storage device. A storage device is any piece of hardware that is capable of storing information such as, for example and without limitation, data, program code in functional form, and/or other suitable information either on a temporary basis and/or a permanent basis. Storage devices may also be referred to as computer readable storage devices in these examples. System memory 104 could include, for example, a random access memory or any other suitable volatile or non-volatile storage device. System memory 104 could also include persistent storage, which may take various forms, depending on the particular implementation.

Source binary application 108 may include source binary code blocks 130 corresponding to a source ISA. Likewise, target binary code blocks 126 correspond to a target ISA. Source binary code blocks 130 may be a sequence of one or more instructions that may, for example, end with a branch instruction. Target binary code blocks 126 are configured to include functionality of a corresponding source binary code block.

Optimizer module 124 may be configured to optimize portions of source binary code blocks 130, for example, condition code blocks 132. The optimized portions may be referred to as target binary code blocks 126. Target binary code blocks 126 may include functionality of source binary code blocks 130 in a form of target binary code blocks 126. The optimized target binary code block may include additional functionality, as described herein.

Target binary code blocks 126 may be stored in an area of system memory designated as a translated code cache 122. More particularly, one or more target binary code blocks 126 that have been translated from one or more corresponding source binary code blocks 130 may be stored in translated code cache 122.

Source binary code block 130 may be translated into target binary code block 126. In some embodiments, a single source binary code block 130 is translated in a single target binary code block 126. However, in other embodiments, there may be any number of source binary code blocks 130 translated into any number of target binary code blocks 126. In other words, the source binary code block may be translated into the target binary code block in response to a call to execute the source binary code block rather than statically, i.e., prior to run time. Target binary code block 126 may then be stored in system memory 104 in translated code cache 122 and provided to processor 102 for execution.

A condition code block allows a developer to encode multiple condition bits 134 of multiple instructions into one conditions-specifying instruction, and condition bits 134 of following instructions can be dynamically resolved. Thus, condition code blocks 132 enable a compiler to generate more compact code. Condition code blocks 132 provide a technique for embedded system ISAs and are implemented as a compact form of condition bits 134.

Condition bits (CB) 134 are used in ISA to allow software developers to set certain bits of an instruction as condition state 103. At runtime, a processor may compare a current condition flag register with condition bits 134 of a current instruction. Then, the processor may dynamically decide either to execute the current instruction or to treat it as a no operation instruction (NOP).

Condition state (CS) 103 is a word data maintained in processor 102 for dynamically resolving condition bits 134 of each instruction in a condition code block (e.g., of condition code blocks 132) and for detecting the end of the condition code block. Condition state 103 can first be initialized by decoding a conditions-specifying instruction of the condition code block, and can be advanced, for example, by bit-mask operations, after executing each instruction in the condition code block. Conditions-specifying instructions may include both advancing and resolving instructions.

For example, in a THUMB2 instruction set of ARM architecture (for example, a 32-bit reduced instruction set computer), condition code blocks 132 can be used to implement a high level if-then-else semantic. There may be an IT instruction (i.e., If-Then instruction) that groups multiple following instructions into one condition code block. An ARM processor maintains a word, referred to as "IT-state," for dynamically resolving condition bits 134 and for conditionally executing each instruction in the condition code block.

The embodiments of this disclosure enhance binary translation by introducing condition state recovery table 128 and optimizer module 124. With this enhancement, condition code blocks 132 emulated in binary translation system 110 can gain several benefits. First, it may be unnecessary to advance condition state 103 and resolve condition bits 134 in translated code. It may also be unnecessary to translate the conditions-specifying instruction of condition code blocks 132 into target binary code blocks 126 (e.g., IT instruction of THUMB2 ISA). Optimizer module 124 may decode multiple condition states on conditions-specifying instructions, remove the conditions-specifying instructions, and transform condition code blocks 132 into series of code, where each instruction in the code has encoded its own condition bit.

Furthermore, binary translation system 110 may have the ability to recover condition state 103 at any point of condition code blocks 132 being translated into target binary code blocks 126. Condition state recovery table 128 enables binary translation system 110 to recover condition states and to support precise exception. Condition state recovery table 128 can identify which range of target binary code blocks 126 can be mapped back to a certain instructions in condition code blocks 132.

Figure 2:
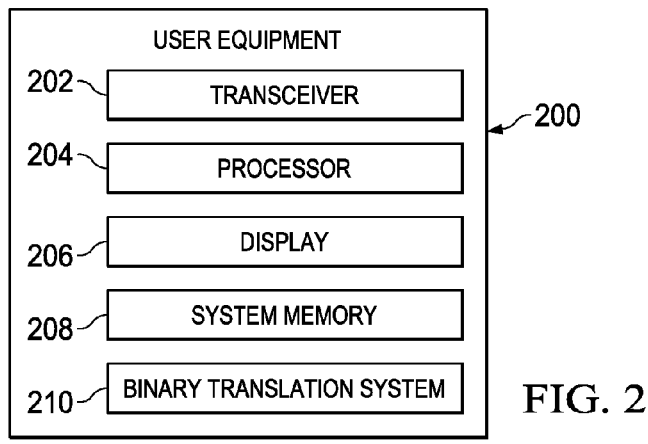
FIG. 2 is an example illustration of user equipment in accordance with an embodiment.

FIG. 2 is an example illustration of user equipment in accordance with an embodiment. In an aspect of this disclosure, user equipment 200 operates as a transmitter and a receiver of wireless communications signals. Specifically, in one example, user equipment 200 may be capable of both transmitting and receiving cellular network voice and data mobile services. Mobile services include such functionality as full Internet access, downloadable and streaming video content, as well as voice telephone communications.

User equipment 200 may correspond to a conventional wireless or cellular portable telephone, for example such a handset that is capable of receiving "3G", or "third generation" cellular services. In another example, user equipment 200 may be capable of transmitting and receiving "4G" mobile services as well, or any other mobile service.

Examples of devices that can correspond to user equipment 200 include cellular telephone handsets and smartphones, such as those capable of Internet access, email, and instant messaging communications, and portable video receiving and display devices, along with the capability of supporting telephone services. It is contemplated that those skilled in the art having reference to this specification will readily comprehend the nature of modern smartphone and telephone handset devices and systems suitable for implementation of the different aspects of this disclosure as described herein. As such, the architecture of user equipment 200 illustrated in FIG. 2 is presented at a relatively high level; even so, it is contemplated that modifications and alternatives to this architecture may be made and will be apparent to the reader, such modifications and alternatives contemplated to be within the scope of this description.

In an aspect of this disclosure, user equipment 200 includes transceiver 202, which is connected to and in communication with an antenna. Transceiver 202 may be a radio frequency transceiver. Also, wireless signals may be transmitted and received via transceiver 202. Transceiver 202 may constructed, for example, including analog and digital radio frequency (RF) "front end" functionality, circuitry for converting RF signals to a baseband frequency, via an intermediate frequency (IF) if desired, analog and digital filtering, and other conventional circuitry useful for carrying out wireless communications over modern cellular frequencies, for example, those suited for 3G or 4 G communications. Transceiver 202 is connected to processor 204, which may perform the bulk of the digital signal processing of signals to be communicated and signals received, at the baseband frequency. One such function of processor 204 is to provide a graphics interface to display 206, for the display of text, graphics, and video to the user.

In an aspect of this disclosure, processor 204 may be a processor, multi-core processor, single core process, micro controller, controller circuit, or any other type of processing device. Processor 204 can execute any type of instructions associated with the data to achieve the operations detailed herein. In one embodiment of this disclosure, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)), or an application-specific integrated circuit (ASIC) that includes digital logic, software, code, electronic instructions, flash memory, optical disks, compact disc read-only memory (CD-ROMs), digital versatile disc (DVD ROMs), magnetic or optical cards, other types of machine-readable mediums suitable for storing electronic instructions, or any suitable combination thereof.

In an aspect of this disclosure, processor 204 may also be coupled to a system memory 208 for storing information to be used in achieving operations associated with binary translation, as outlined herein. These devices may further keep information in any suitable system memory (e.g., random access memory (RAM), read only memory (ROM), FPGA, EPROM, EEPROM, etc.), software, hardware, or in any other suitable component, device, element, or object where appropriate and based on particular needs. Any of the memory or storage items discussed herein should be construed as being encompassed within the broad term "system memory" as used herein in this Specification.

In an aspect of this disclosure, system memory 208 of user equipment 200 may also include binary translation system 210. Binary translation system 210 may be configured to allow an application, compiled for one instruction set architecture to run on a different ISA. Essentially, a binary translation system can translate binaries built for a source ISA to binaries that can run on a target ISA. Binary translation system 210 may be one example of binary translation system 110.

Figure 3:
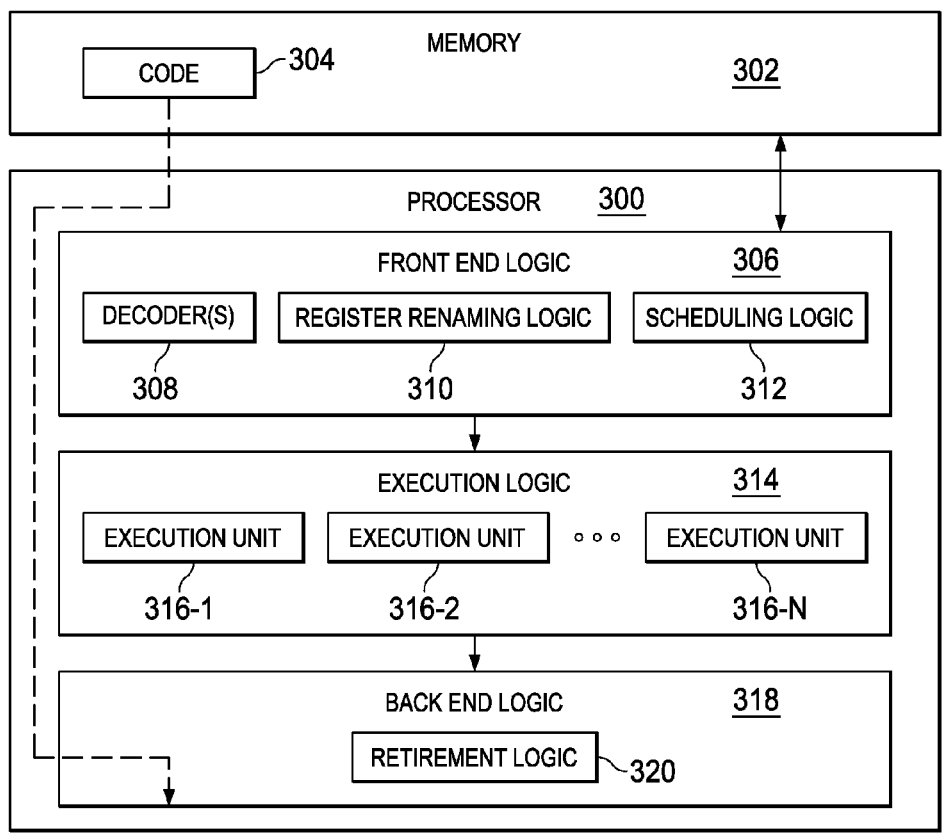
FIG. 3 is an example illustration of a processor according to one embodiment.

FIG. 3 is an example illustration of a processor according to one embodiment. Processor 300 may be the core for any type of processor, such as a microprocessor, an embedded processor, a digital signal processor (DSP), a network processor, or other device to execute code. Although only one processor 300 is illustrated in FIG. 3, a processing element may alternatively include more than one of processor 300 illustrated in FIG. 3. Processor 300 may be a single-threaded core or, for at least one embodiment, the processor 300 may be multithreaded in that it may include more than one hardware thread context (or "logical processor") per core.

FIG. 3 also illustrates a memory 302 coupled to processor 300. Memory 302 may be any of a wide variety of memories (including various layers of memory hierarchy) as are known or otherwise available to those of skill in the art. The memory 302 may include code 304, which may be one or more instructions, to be executed by processor 300. Processor 300 follows a program sequence of instructions indicated by code 304. Each instruction enters a front end logic 306 and is processed by one or more decoders 308. The decoder may generate as its output a micro operation such as a fixed width micro operation in a predefined format, or may generate other instructions, microinstructions, or control signals that reflect the original code instruction. Front end logic 306 also includes register renaming logic 310 and scheduling logic 312, which generally allocate resources and queue the operation corresponding to the convert instruction for execution.

Processor 300 is shown including execution logic 314 having a set of execution units 316-1 through 316-N. Some embodiments may include a number of execution units dedicated to specific functions or sets of functions. Other embodiments may include only one execution unit or one execution unit that can perform a particular function. Execution logic 314 performs the operations specified by code instructions.

After completion of execution of the operations specified by the code instructions, back end logic 318 retires the instructions of code 304. In one embodiment, processor 300 allows out of order execution but requires in order retirement of instructions. Retirement logic 320 may take a variety of forms as known to those of skill in the art (e.g., re-order buffers or the like). In this manner, processor 300 is transformed during execution of code 304, at least in terms of the output generated by the decoder, hardware registers and tables utilized by register renaming logic 310, and any registers (not shown) modified by execution logic 314.

Although not illustrated in FIG. 3, a processing element may include other elements on a chip with processor 300. For example, a processing element may include memory control logic along with processor 300. The processing element may include I/O control logic and/or may include I/O control logic integrated with memory control logic. The processing element may also include one or more caches.

Figure 4:
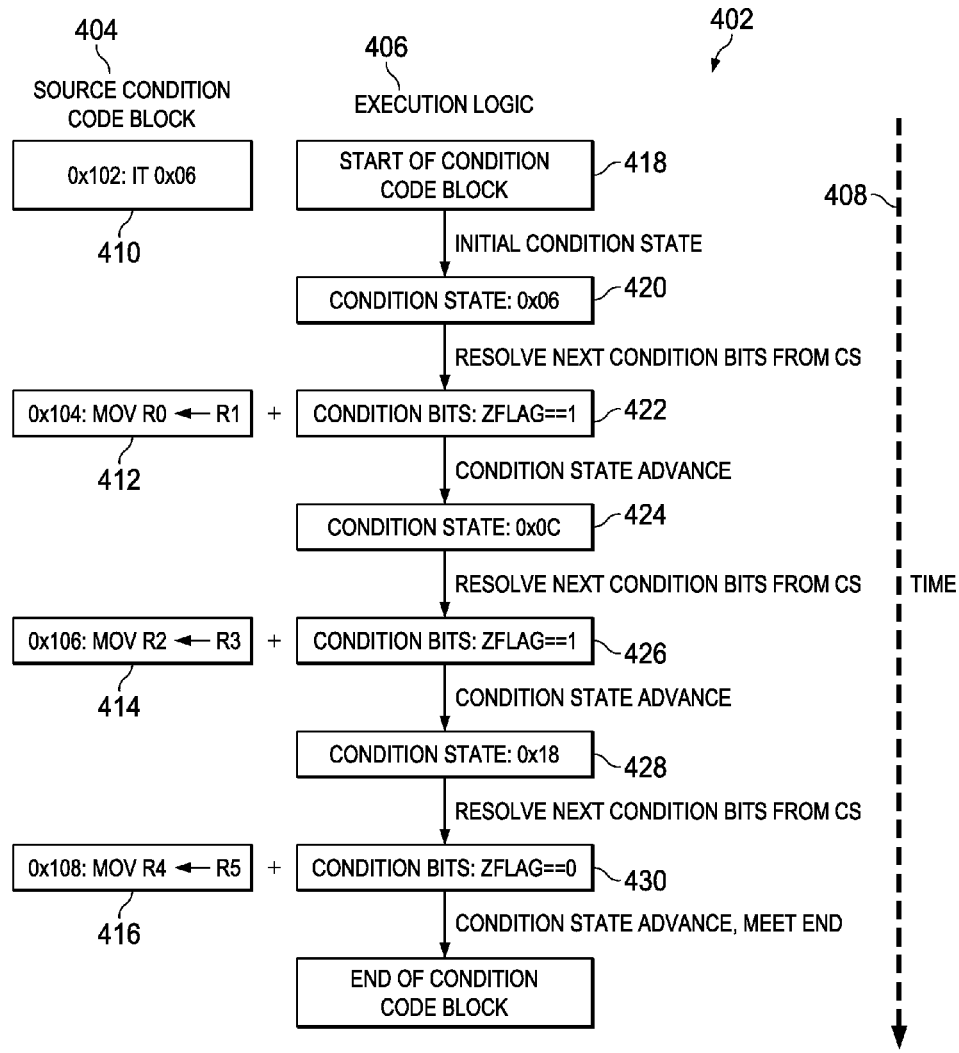
FIG. 4 is an illustration of an execution order of instructions of a source instruction set architecture in accordance with an embodiment.

FIG. 4 is an illustration of an execution order of instructions of a source instruction set architecture in accordance with an embodiment. The source instruction set architecture (ISA) 402 includes source condition code block 404 and execution logic 406. Source condition code block 404 includes instructions 410, 412, 414, 416. The illustration in FIG. 4 depicts the execution of instructions 410-416 over time 408.

By way of illustration, instruction 410 includes address 0x102 and the operation of IT 0x06. In this example, IT 0x06 may be the operation for a start 418 of source condition code block 404.

An initial condition state 420 may be 0x06. From condition state 420, execution logic 406 may resolve the first condition of the instruction 412. Execution logic 406 may identify a condition bit 422. Condition bit 422 may include a ZFLAG. If the ZFLAG is a "1" then execution logic 406 executes instruction 412. After executing instruction 412, execution logic 406 may advance to condition state 424, and resolve condition bit 426. Then, execution logic 406 may execute instruction 414 because the ZFLAG of condition bit 426 is a "1".

This process is repeated using condition bit 430, condition state 428, and instruction 416 until the end of source condition code block 404. In some systems, a condition state with an "8" at the end indicates the end of a condition code block. For example, condition state 428 is 0x18, and in some systems may indicate the end of a condition code block.

In some embodiments, an example process of execution logic 406 may start with resolving the following: 1) the initial condition state 0x06 (hexadecimal number) is "0000 0110" in binary form, 2) the high 4-bits are "0000" which means the condition bit ZFLAG=1, and 3) the low 4-bits are "0110," which is not equal to "1000" (1000 is the binary equivalent of 8) which means the condition code block has not ended and includes more instructions to be executed.

Figure 5:
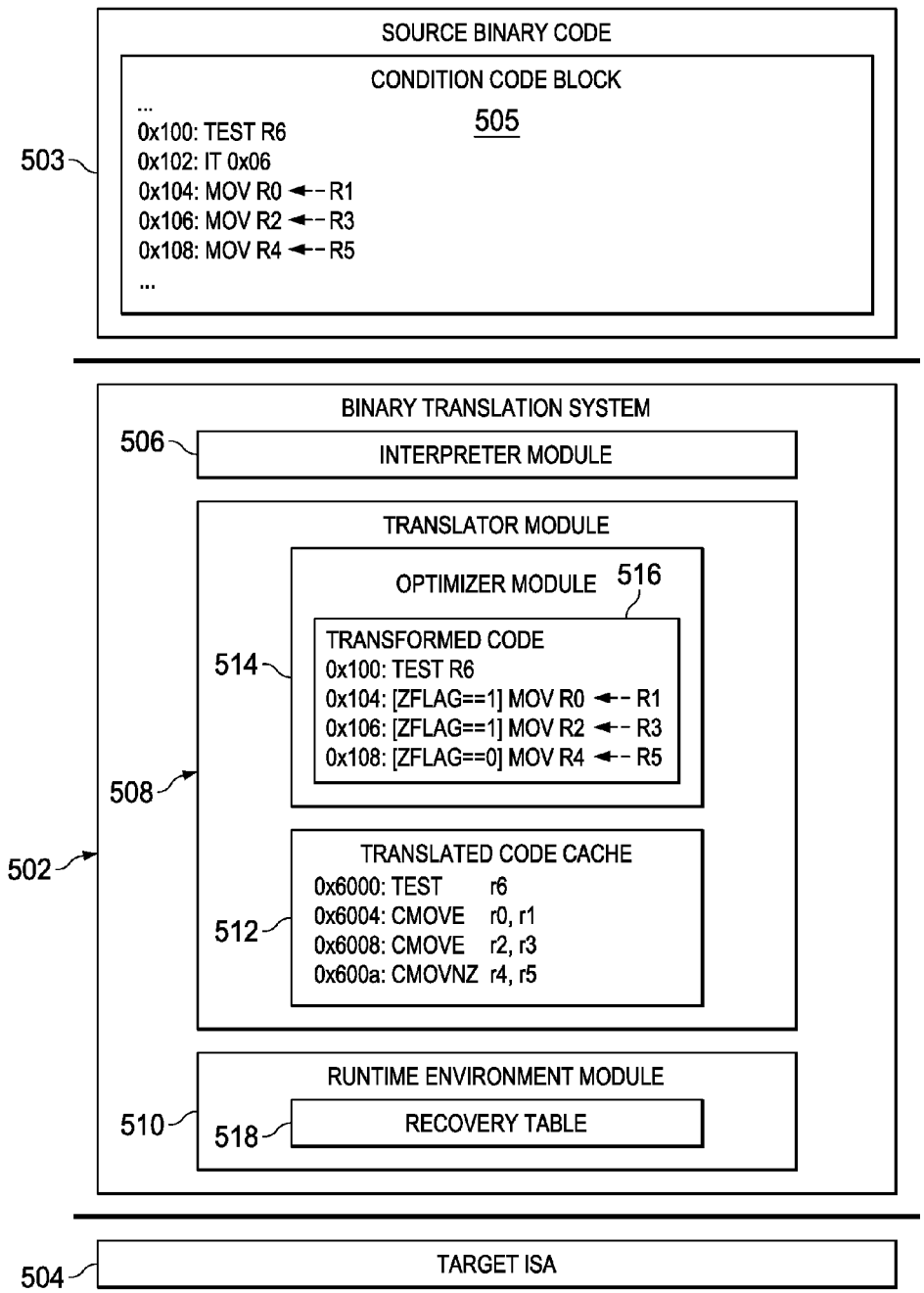
FIG. 5 is an illustration of a binary translation system with an optimizer module in accordance with an embodiment.

FIG. 5 is an illustration of a binary translation system 502 with an optimizer module 514 in accordance with an embodiment. Binary translation system 502 translates code from a source binary code 503 to a code on a target ISA 504. In an example embodiment, binary translation system 502 can accelerate, compared to interpreter module 506, the binary translation for emulating condition code block 505 located in source binary code 503. Binary translation system 502 does not need to emulate condition state advancing and condition bit resolving, which saves time in transformed code 516.

In an example embodiment, condition code block 505 of source binary code 503 includes the example instructions as shown in FIG. 4. Binary translation system 502 may include an interpreter module 506, a translator module 508, and a runtime environment module 510. Translator module 508 may be an example of translator module 118 from FIG. 1. Binary translation system 502 may be one example of binary translation system 110 as shown in FIG. 1. Source binary code 503 may be an example of source binary code blocks 130 from FIG. 1.

Interpreter module 506 can be configured as an interpretation engine that executes source binary code 503. Interpreter module 506 can also trigger utilization of translator module 508 when it identifies a hot code trace. A hot code trace may also be referred to as a hot basic block. Binary translation system 502 may implement probes (counters) to detect "hot" (i.e., frequently executed) basic blocks. An example of a hot code trace may be, for example, condition code block 505.

Translator module 508 performs source binary code 503 to target ISA 504 binary translation on each hot code trace. Translator module 508 has a translated code cache 512 that stores translated code blocks. Translated code cache 512 may be one example of translated code cache 122 from FIG. 1.

Translator module 508 also has optimizer module 514 that optimizes source binary code 503 during translation. Optimizer module 514 may optimize source binary code 503 by transforming it into a transformed code 516. Transformed code 516 may be produced from a pre-execution of the source binary code 503 with the advancing and resolving operations (or instructions) eliminated. Optimizer module 514 may be able to identify some or all of the conditions during the pre-execution of the source binary code 503.

Optimizer module 514 can perform a source ISA to source ISA transformation on condition code block 505. Optimizer module 514 also decodes the multiple conditions on a conditions-specifying instruction, removes the conditions-specifying instruction, and transforms the condition code block into a series of code as if each instruction has encoded its own condition bits. In this example, IT 0x06 may be the instruction for the start of condition code block 505

Runtime environment module 510 provides supporting environment and helper libraries to run translated code on target ISA 504.

In operational terms, and in terms of one particular embodiment the translator module working flow may perform as follows: When a source binary application runs on binary translation system 502, interpreter module 506 starts to execute source binary code 503. When condition code block 505 is detected (e.g., as a hot code trace), interpreter module 506 triggers translator module 508 to perform source ISA to target ISA translation. During translation, when translator module 508 meets condition code block 505, it invokes optimizer module 514 to perform source binary code 503 transformations.

Then, optimizer module 514 decodes condition bits on a conditions-specifying instruction of condition code block 505, statically advances the condition state and resolves condition bits on each following instruction, and finally removes the conditions-specifying instruction of condition code block 505. In this way, optimizer module 514 transforms condition code block 505 into a series of code (e.g., transformed code 516), as if each instruction has encoded its own condition bits.

Also, translator module 508 does source ISA to target ISA translation. For source binary code 503 in condition code block 505, translator module 508 guarantees that the translation of each condition code block instruction is strictly in program order, i.e., instruction reordering may not be performed. The address mapping of condition code block 505 may also be recorded in condition state recovery table 518 of the system.

Figure 6:
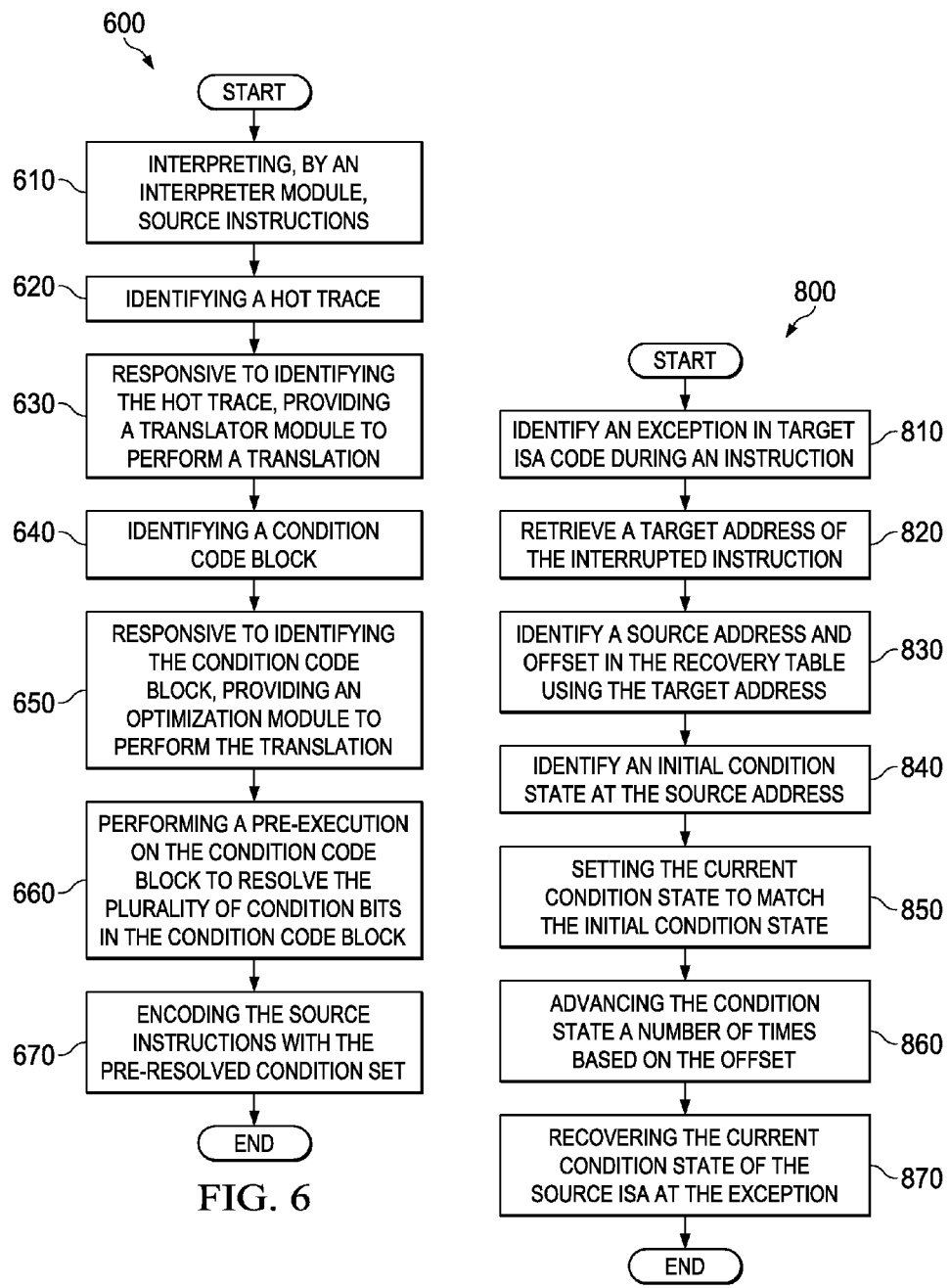
FIG. 6 is a simplified flowchart illustrating a method for binary translation with an optimizer module in accordance with an embodiment.

FIG. 6 is a simplified flowchart illustrating a method for binary translation with an optimizer module in accordance with an embodiment. The flow 600 may begin at 610, when the interpreter module interprets source instructions. By interpreting the instructions, the interpreter module takes each instruction, analyzes, the instruction, and executes the instruction on the source ISA. During the interpretation, the interpreter module may identify a hot trace (or hot basic block) at 620.

Once a hot trace is identified, the binary translation system may provide a translator module to perform a translation at 630. The translator module then converts (also referred to as "translates") the source instructions to transformed instructions. In one or more embodiments, transformed instructions may include target instructions, which may also be referred to as target binary code or translated code. At 640, the translator module may identify a condition code block within the hot trace.

At 650, the translator module may handover the conversion (also referred to as the "translation") to the optimizer module in response to identifying the condition code block. The optimizer module may be a part of the translator module. Next, the optimizer module may perform a pre-execution of the condition code block at 660. The pre-execution may resolve the condition bits in the block to form a pre-resolved condition set, as well as eliminate the need for emulation of condition state advancing. The reduction of these commands makes the translated code more efficient.

After the pre-execution, at 670, the optimizer module may encode the source instructions with the pre-resolved condition set when converting to an intermediate instruction set to run on the target ISA. Each of the new instructions may be a combined instruction set that is encoded with the condition information. In this example, the translator module does not have to spend resources to identify and advance the condition state. Additionally, the initial condition-specifying instruction is no longer necessary. Thereafter, the process terminates.

Figure 7:
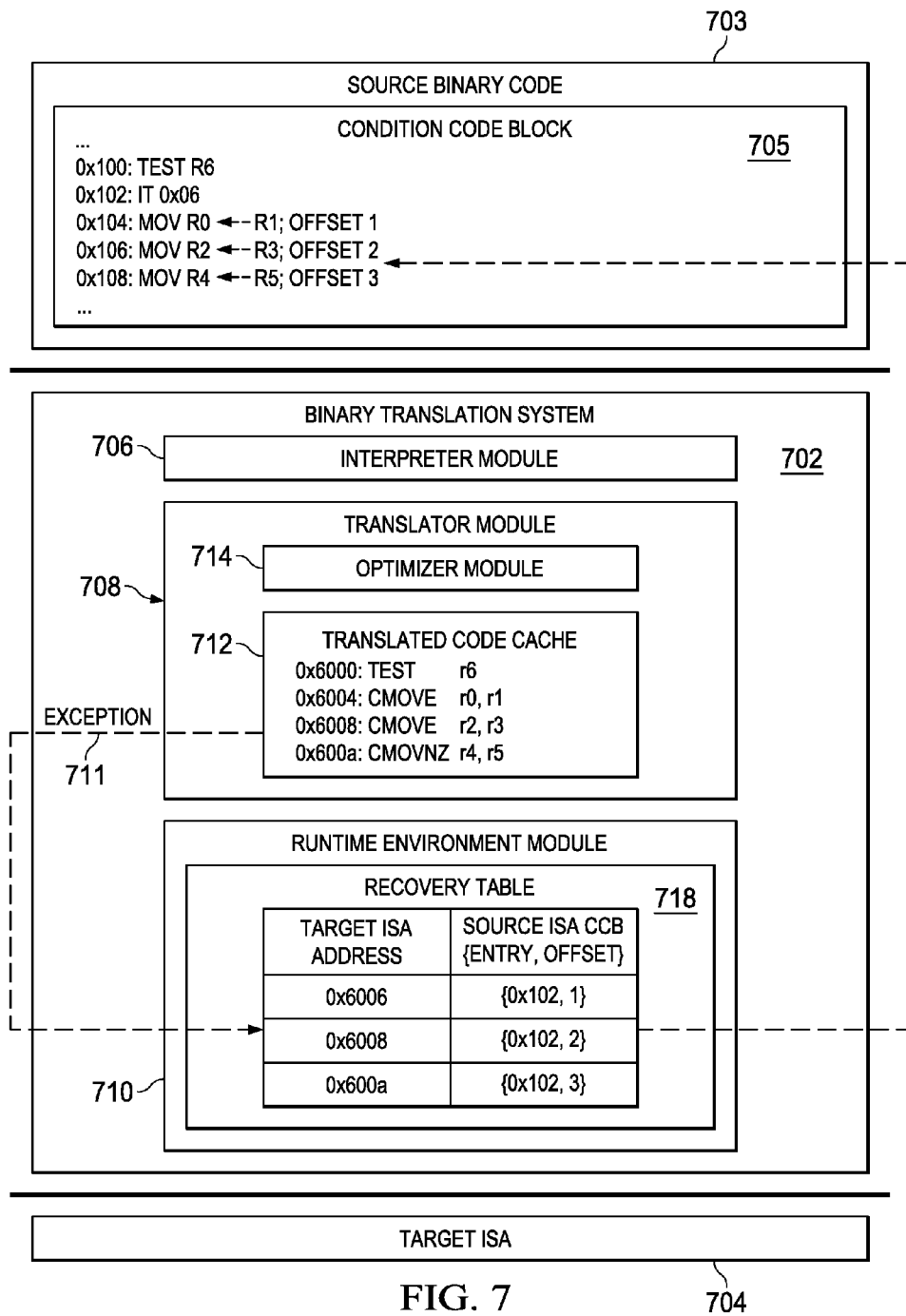
FIG. 7 is an illustration of a binary translation system with a recovery table in accordance with an embodiment.

FIG. 7 is an illustration of a binary translation system 702 with a recovery table 718 in accordance with an embodiment. Binary translation system 702 in FIG. 7 is similar to binary translation system 502 in FIG. 5. For instance, binary translation system 702 translates code from a source binary code 703 to code for a target ISA 704. Binary translation system 702 also includes an interpreter module 706, a translator module 708, and a runtime environment module 710. Translator module 708 includes an optimizer module 714 and a translated code cache 712. Runtime environment module 710 of binary translation system 702 includes a recovery table 718. Also, the various components in binary translation systems 502 and 702 may be combined in different ways to form other binary translations systems according to the various embodiments.

During execution of the instructions in translated code cache 712, sometimes an interrupt or exception 711 occurs. During exception 711, translator module 708 may lose the condition state information that was pre-resolved by optimizer module 714. Accordingly, translator module 708 may consult recovery table 718 to help recover the condition state information.

Figure 9:
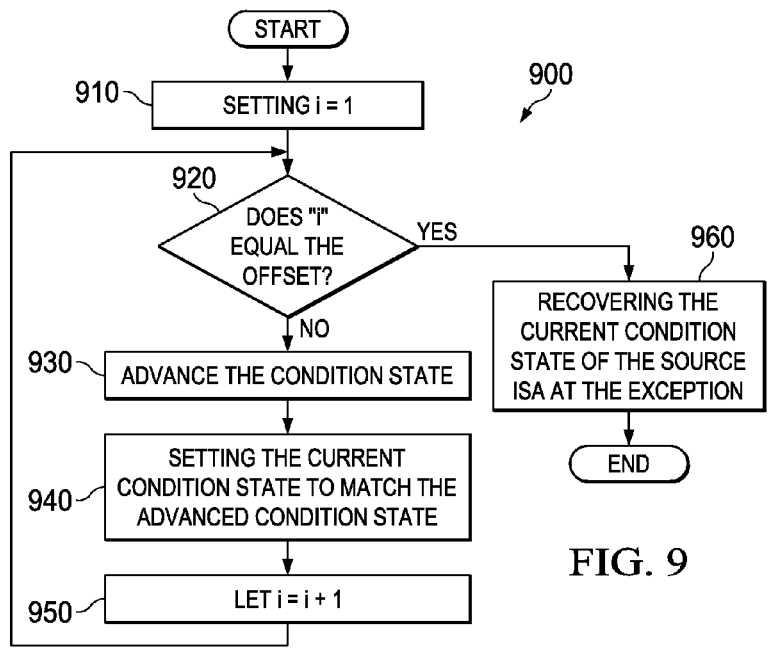
FIG. 9 is a simplified flowchart illustrating a method for advancing the condition state using the recovery table in accordance with an embodiment.

In operational terms, and in terms of one particular embodiment, when exception 711 occurs in translated code of a translation of condition code block 705, a condition state recovery process can include runtime environment module 710 catching exception 711 and identifying an address of the exception instruction in recovery table 718. If the address is not in recovery table 718, runtime environment module 710 does a normal state recovery process. If the address can be found in recovery table 718, runtime environment module 710 fetches the original condition code block 705 address in source binary code 703, and starts a condition state recovery process, for example, the process as shown in FIGS. 8 and 9.

From the address, runtime environment module 710 can re-decode the condition bits in the conditions-specifying instruction, re-advance condition state to the faulting point, and re-resolve the condition bits of the faulting source ISA instruction. Hence, the condition state of the faulting point can be correctly recovered. Runtime environment module 710 can recover other source ISA states. Once all source ISA states are recovered, binary translation system 702 can safely invoke interpreter module 706.

A condition state recovery process can include, as input, an exception/interrupt ip in target ISA code. The process can include, as output, a recovered condition_state. Pseudo code could be configured accordingly:

```
let eip = exception/interrupt ip in target ISA code
{offset,ccb_entry_ip}=
BT.runtime.condition_state_recovery_table[eip]
    condition_state = BT.runtime.decode(ccb_entry_ip)
    for i = 1 to offset:
        condition_state=
BT.runtime.condition_state_advance(condition_state)
```

FIG. 8 is a simplified flowchart 800 illustrating a method for binary translation by a binary translation system with a condition state recovery table (e.g., binary translation system 702 as shown in FIG. 7) in accordance with an embodiment. The flow may begin at 810, when the binary translation system (BTS) identifies an exception/interrupt during execution of an instruction of translated code. Then, at 820, the binary translation system retrieves an address of the interrupted instruction.

Next, using the target address, the binary translation system can use a recovery table to identify a source address at 830. The source address may include an entry address along with an offset. The entry address may be the beginning address of the condition code block in the source binary code. Additionally, the offset may be multiplied by the instruction size. For example, as shown in FIG. 7, the recovered source address would be 0x102 (entry) plus 2 (offset) times 2 (instruction size). For example, the instruction size may be 2 for a 2-byte instruction.

Once a source address is identified, the binary translation system can identify, at 840, the corresponding initial condition state at the source address. The initial condition state may be the initial state of the condition code block in the source ISA, containing the source instruction that was translated to the interrupted target ISA code instruction.

At 850, the binary translation system sets the current condition state in the translator module to the initial condition state that was identified at the source address. However, the initial condition state is not the desired state. To find the desired state, at 860, the binary translation system may need to advance the condition state a number of times based on the value of the offset. The process for advancing the condition state is shown in FIG. 7. Once the condition state has been advanced the proper number of times, at 870, the binary translation system may recover the current condition state of the source binary code at the exception (i.e., at the faulting address).

FIG. 9 is a simplified flowchart 900 illustrating a method for advancing the condition state using the recovery table in accordance with an embodiment. The flow in FIG. 9 may complement parts of flow 800 of FIG. 8. The binary translation system goes through the conditions until it locates the condition state of the source binary code instruction that was interrupted. To find the correct condition, the binary translation system initiates a loop.

The binary translation system sets a variable to "1" at 910. Then, at 920, the binary translation system determines whether the variable meets the offset that was identified in the recovery table If the variable meets the offset, then at 960, the binary translation system sets the condition at the exception in the target binary code to the current condition state in the source binary code.

If the variable does not match the offset, the binary translation system advances the condition state at 930. The binary translation system then sets the current condition state to the advanced condition state at 940. Also, the binary translation system advances the variable at 950. The process is then repeated beginning at 920. Once the variable meets the offset that was identified in the recovery table, the current condition state of the source ISA at the exception is recovered at 960, and thereafter the process terminates.

The embodiments of this disclosure recognize that during binary translation, when an interrupt or exception occurs, current systems may recover the state of the source binary code by falling back to the interpreter to finish execution slowly and safely. However, the embodiments of this disclosure provide a process for the translator to recover the condition state.

Figures 10A, 10B:
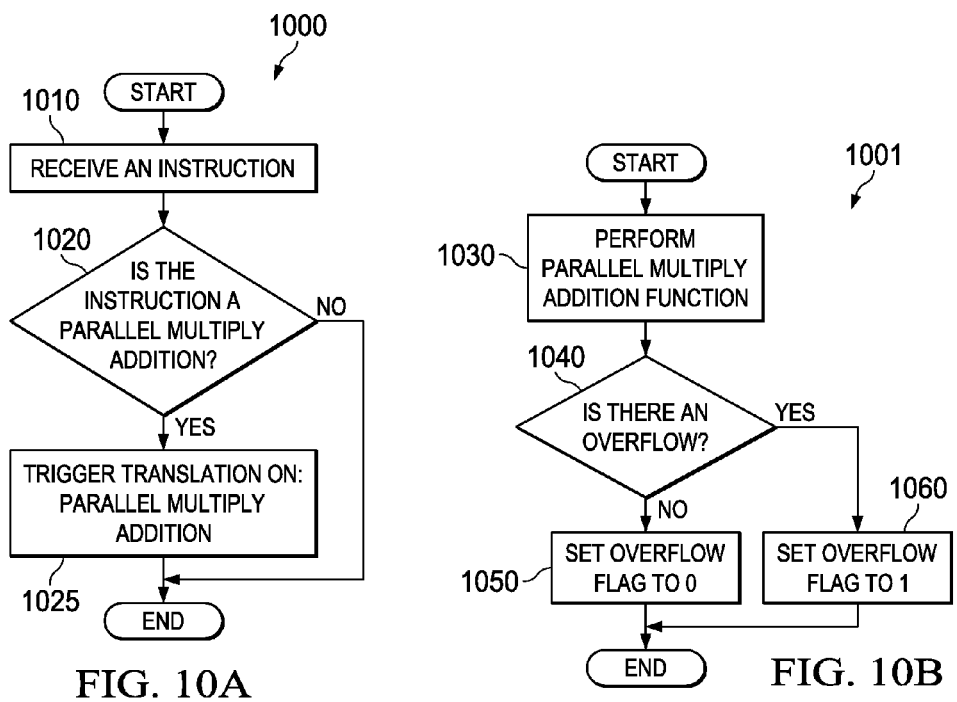
FIG. 10A is a simplified flowchart illustrating a method for identifying a parallel-multiply-addition instruction in accordance with an embodiment.
FIG. 10B is a simplified flowchart illustrating a method for binary translation with a parallel-multiply-addition instruction in accordance with an embodiment.

FIG. 10A is a simplified flowchart illustrating a method for identifying a parallel-multiply-addition instruction in accordance with an embodiment. A flow 1000 may begin at 1010, when the translator module receives an instruction.

Then, at 1020, the translator module determines whether the instruction is a parallel-multiply-addition instruction. If the instruction is not a parallel-multiply-addition instruction, the process terminates. If the instruction is a parallel-multiply-addition instruction, at 1025, the translator module triggers a translation on the parallel-multiply-addition instruction. The translator module may identify the parallel-multiply-addition instruction as including:

```
Vector 1 = X1X0
Vector 2 = Y1Y0
Dest_tmp = X1*Y1 and X0*Y0
Dest = X1*Y1 + X0*Y0,
``` with the dest address including the result of the parallel-multiply-addition instruction.

FIG. 10B is a simplified flowchart illustrating a method for binary translation with a parallel-multiply-addition instruction in accordance with an embodiment. The flow 1001 may begin at 1030, when the translator module generates translated code to perform a parallel-multiply-addition function on the source vectors indicated in the instruction. For example, if there are two source vectors, they are multiplied and the resulting vector may be referred to as the destination vector.

At 1040, in the translated code, once the function has been executed, the translated code determines whether there was an overflow. To identify an overflow, the translated code compares the destination vector to a constant. For example, in an embodiment, if the destination vector is equal to the value of [0x1<<(S*N−1)] then an overflow is detected. In this formula, "S" is the size of vector elements and "N" is the number of vector elements. Thus, (S*N) is the vector size. If an overflow was not detected, at 1050, an overflow flag is set to "0". If an overflow is detected, at 1060, the overflow flag is set to "1".

The embodiments of this disclosure improve the efficiency in binary translation for parallel multiply instruction and its variants (addition, subtraction, extension) when target ISA does not offer these instructions with the same semantics.

In operational terms, and in terms of one particular embodiment, parallel multiply addition multiplies the individual signed elements of the first source vector by the corresponding signed elements of the second source vector, producing temporary signed, double element results. The adjacent double element results are then summed and stored back to the destination vector.

In other implementations, the variants of parallel multiply instruction may have slightly different semantics. Overflow may occur during the addition. Addition may become subtraction, eliciting Parallel Multiply Subtraction, which has no target ISA counterpart. Moreover, a third source vector may be added to the final result.

The embodiments of this disclosure provide processes that show how to efficiently translate the parallel multiply instruction and its variants to the basic operation when only a portion of instructions of the target ISAs is mapped. A vector may contain several elements. Herein, (S) is denoted as the element size, (N) is denoted as the number of elements of the vector, and (N*S) is the vector size.

In order to implement the closest target ISA instruction into parallel multiply instruction and its variants, overflow and negation of the Parallel Multiply Addition function should be efficiently emulated during the translation.

Overflow only occurs in Parallel Multiply Addition if the summed result reaches a specific overflow boundary value. In this situation, the overflow flag may need to be set.

Pseudo code of overflow:

```
dest = parallel_multiply_add (src1, src2)
If ( dest == 0x1<<(S*N−1) ) generate O_flag
```

The embodiments of this disclosure may detect the overflow condition by comparing the result value to a constant value. There may only be one condition that the Parallel Multiple Addition can overflow. For example, when all elements of multiply operation are of the biggest absolute value negative 0x1<<(S−1), and the multiply operation generates positive 0x1<<(2S−2). When these two positive numbers are summed, it produces 0x1<<(2S−1). The vector size cannot hold this large result, which produces an overflow boundary value.

For example, assume an element size is 8-bit, and the resulting size is 16-bit. Also assume vector1=0x8080, and vector2=0x8080. In this case, parallel_multiply_add (vector1, vector2)=0x80*0x80+0x80*0x80=0x4000+0x4000=0x8000. The result is a negative number and, therefore, overflow occurs (two positive numbers are summed to a negative number). Consequently, 0x8000 is determined as an overflow boundary.

When a variant of Parallel Multiply Addition requires setting an overflow flag (O_flag), detecting overflow information helps to generate the correct O_flag efficiently. When a variant of Parallel Multiply Addition adds a third source vector to the result of Parallel Multiply Addition, the overflow that occurred during Parallel Multiply Addition affects the calculation of the last addition. Therefore, the overflow conditions that occurred during the first addition and the last addition are combined. Detecting overflow in the Parallel Multiple Addition helps to generate efficient code to calculate the combined overflow flag.

FIG. 11A is a simplified flowchart illustrating a method for identifying a parallel-multiply-subtraction instruction in accordance with an embodiment. A flow 1100 may begin at 1110, when the translator module receives an instruction.

Then, at 1120, the translator module determines whether the instruction is a parallel-multiply-subtraction instruction. In an embodiment, there may be two vectors, a first source vector and a second source vector. Each vector may have an upper half and a lower half. For example if the first source vector is X1X0 then the lower half is X0. Likewise, a second source vector may have the values Y1Y0. In this example, the value "Y0" may be negated. The vector to be subtracted may be the second source vector. For example, the equation may be the first source vector minus the second source vector.

If the instruction is not a parallel-multiply-subtraction instruction, as determined at 1120, the process terminates. If the instruction is a parallel-multiply-subtraction instruction, then at 1125, the translator module triggers a translation on the parallel-multiply-subtraction instruction.

FIG. 11B is a simplified flowchart illustrating a method for binary translation with a parallel-multiply-subtraction instruction in accordance with an embodiment. The flow 1101 may begin at 1130, when the translator module generates translated code configured to perform a bitwise-not on a low element of a second source vector. At 1135, after the element is changed by the bitwise-not operation, the translated code is then configured to perform a parallel-multiply-addition function on the source vectors indicated in the instruction. For example, if there are two source vectors, they are multiplied and produce a resulting vector. Then, at 1140, the low element of the first source vector is sign extended and added to the resulting vector. This final vector may be referred to as the destination vector.

Next, the flow moves to identifying an overflow. At 1150, the translated code may be configured to determine whether there is an overflow at the destination vector. The translated code may be configured to compare the destination vector to a constant to identify an overflow. For example, the translated code may be configured to identify the vector to the constant [0x1<<(S*N−1) plus sign extended (0x1<<(S−1)].

If there is an overflow, at 1160, the translated code may be configured to set the resulting destination vector to a constant value. Thereafter, the process may terminate. If there is not an overflow, at 1170, the translated code may be configured to then determine whether the high elements were subtracted from the low elements, or vice versa. For example, in the above operations assume that the low elements are subtracted from the high elements. However, if the reverse occurs, the destination vector may need to have a bitwise-not operation applied. Accordingly, if it is determined at 1170 that the low elements are subtracted from the high elements, in other words, the high elements are not subtracted from the low elements, the process may terminate. On the other hand, if it is determined at 1170 that the high elements are subtracted from the low elements, then at 1180, the translated code is configured to perform a bitwise-not operation on the destination vector. Thereafter, the process may terminate.

In operational terms, and in terms of one particular embodiment, when translating Parallel Multiply Subtraction (addition becomes subtraction), the second source vector's low element needs to be negated before the operation, so that Parallel Multiply Addition can be used to perform Parallel Multiply Subtraction.

Pseudo code of Parallel Multiply Subtraction 1:

```
src2.low_Sbit = not (src2.low_Sbit)
dest' = parallel_multiply_add (src1, src2)
dest = dest' + Sign-extend(src1.low_Sbit)
```

In a second portion of the method, overflow may occur in Parallel Multiply Addition. This occurs when the inputs hold specific values, and therefore, the final result can be determined directly.

Pseudo code of Parallel Multiply Subtraction 2:

```
If (overflow detected)
{
dest = (0x1<<(S*N−1)) + sign_extend(0x1<<(S−1))
}
```

In a third portion of the method, Parallel Multiply Subtraction has two different subtraction orders, high elements multiply result subtracts low elements multiply result, or low elements multiply result subtracts high elements multiply result. The above paragraphs address high elements multiply result subtracting low elements multiply result. In the alternative scenario, when low elements multiply result subtracts high elements multiply result, a negation of the final result is performed.

Pseudo code of Parallel Multiply Subtraction 3:

```
dest=~dest
```

The different embodiments provide translations of source binary code into target binary code when the target binary code does not provide equivalent counterparts to overflow and negation problems occurring in the translations of parallel multiply instructions.

With respect to FIGS. 10 and 11, current translations for parallel multiply instructions use target ISA's general multiply instructions to emulate packed elements multiply. To implement a parallel multiply of two vectors that contain "N" number of elements, "N" times of a general multiply are performed. In addition, extracting elements from the vector needs an extra shift operation. An overflow flag is generated during the addition. However, it should be used to perform the addition to a third vector if this instruction's semantics requires a third addition. This translation may be performed by more than ten instructions.

The embodiments of this disclosure combine the "N" number of multiplies together as one operation to translate the Parallel Multiply Addition efficiently. In other words, one parallel multiply instruction can be implemented to emulate several general multiply instructions. The embodiments disclosed herein detect the overflow condition by comparing the resulting value to a constant value. Also, embodiments disclosed herein negate one element of the source vector to handle the Parallel Multiply Subtraction. A new translation may be imported into the binary translation system proposed by the embodiments of this disclosure.

An example overflow handling algorithm may be configured as follows:
Input: A sequence of source ISA instruction, denoted as SIA_INST
Output: An overflow flag information, denoted as O_flag
Algorithm:

```
Begin
dest = parallel_multiply_add (src1, src2)
If ( dest == 0x1<<(S*N-1) )
generate o_flag
Endif
End
```

An example Parallel Multiply Subtraction algorithm may be configured as follows:
Input: A sequence of source ISA instruction, denoted as SIA_INST
Output: A sequence of target ISA instruction, denoted as TIA_INST
Algorithm:

```
Begin
Src2.low_Sbit = not (src2.low_Sbit)
dest' = Parallel_multiply_add (src1, src2)
dest = dest' + Sign-extend(src1.low_Sbit)
If (overflow detected)
dest = const_val
Endif
If (low elements subtract high elements) dest = ~dest
Endif
End
```

Figure 12A:
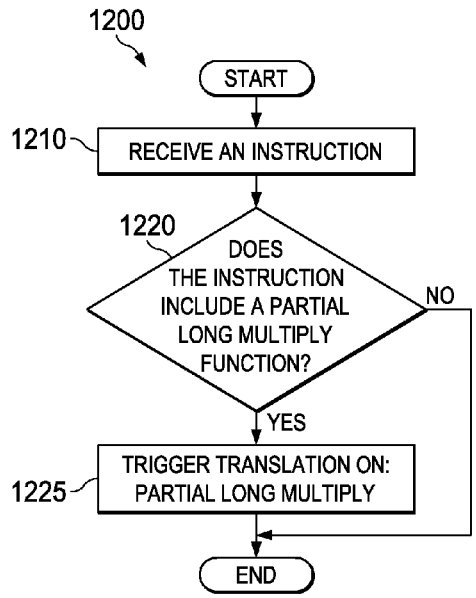
FIG. 12A is a simplified flowchart illustrating a method for identifying a partial-long-multiply instruction in accordance with an embodiment.

FIG. 12A is a simplified flowchart illustrating a method for identifying a partial-long-multiply instruction in accordance with an embodiment. A flow 1200 may begin at 1210, when the translator module receives an instruction.

Then, at 1220, the translator module determines whether the instruction is a partial-long-multiply instruction. If the instruction is not a partial-long-multiply instruction, the process terminates. If the instruction is a partial-long-multiply instruction, then at 1225, the translator module triggers a translation on the partial-long-multiply instruction.

Figure 12B:
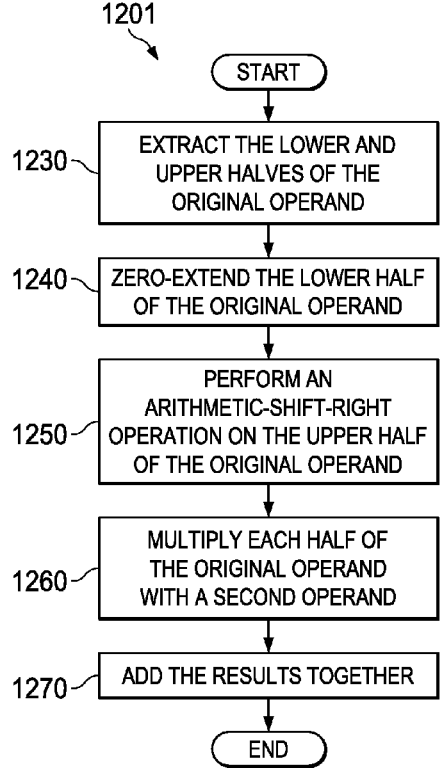
FIG. 12B is a simplified flowchart illustrating a method for binary translation with a partial-long-multiply instruction in accordance with an embodiment.

FIG. 12B is a simplified flowchart illustrating a method for binary translation with a partial-long-multiply instruction in accordance with an embodiment. The flow 1201 may begin at 1230, when the translator module generates translated code to extract the lower and upper halves of the original operand of the instruction to form two operands. Also, at 1240, the translated code may be configured to zero-extend the lower half of the original operand, from half size to full size. Next, at 1250, the translated code may be configured to do an arithmetic-shift-right on the upper half of the original operand, from half size to full size.

Next, at 1260, the translated code may be configured to multiply each half of the original operand with a second operand to form two products. Finally, at 1270, the translated code may be configured to add the two products together. In order to add the products together, the translated code may be configured to adjust the lower-half-multiply-product from full size back to half size, by using arithmetic-shift-right. Thereafter, the process terminates.

The embodiments of this disclosure improve the efficiency in binary translation for Partial Long Multiply instructions (e.g., signed Word by Halfword Multiply instruction in ARM) when source ISA and target ISA do not offer these instructions with the same semantics.

In operational terms, and in one embodiment, a Partial Long Multiply instruction multiplies a signed long-bit quantity by a signed short-bit quantity, and produces a partial long-bit result. For example, a 16-bit quantity is multiplied by a 32-bit quantity that produces a 48-bit result; the top 32 bits of the 48-bit result are stored while the bottom 16 bits of the 48-bit result are ignored. An extra accumulate function can be performed depending on the instruction's semantic.

Different ISAs may implement different variants of multiply instructions. Typically, the source vectors have the same data size. When translating a multiply instruction of source vectors with different data sizes, however, it is inefficient to auto-extend the shorter data size into the longer data size, use long multiply instruction to perform the calculation, and extract the needed bits to a destination vector.

Long multiply can be more expensive than short multiply. In comparison to short multiply, long multiply has several disadvantages for translation. In long multiply, efficiency is low. Long multiply has a longer latency and takes both ports, restricting the pipeline. There are also register constraints. A target ISA instruction may occupy a specific register as the operand register that sabotages other components' optimization.

The embodiments of this disclosure provide how to efficiently translate the Partial Long Multiply instruction by using two short multiply instructions to emulate long multiply instruction. The embodiments use the following denotation in this disclosure. A signed multiply Word by Halfword instruction is denoted as SMULWH. Short-bit Size of the instruction vector is denoted as SB, while Long-bit Size (LB=2*SB) is denoted as LB.

If only a portion of the multiply result is needed, two short multiplies can be used to emulate one long multiply. It equally divides the long-bit source vector into two parts (low-bit half and high-bit half), multiplies these two parts by the second short-bit vector separately, and adds these two intermediate results together to yield the final result. A shift is performed before the addition to align the two intermediate results to the corresponding position.

The translation for a Partial Long Multiply instruction generally contains two functions. The first function prepares two parts of the long-bit source vector (src_long). A low half extension (extend (src_long.low_half)) and a high half shift (src_long>>SB) are executed. The low half extension can be a zero extension, and the high half shift can be an arithmetic shift.

The second function multiplies these two parts with the short-bit vector and assembles the intermediate results together. It shifts one multiplying result (low_multiply_result<<SB), then adds two multiplying results together to generate the final result. A third source vector may be added to the final result according to the source ISA instruction's semantics.

Typically, when encountering a multiply with two vectors with different data sizes, a long-bit data size is selected as the operation size, a short-bit data size vector is signed or unsigned extended to the long-bit data size vector, and a long multiply instruction is used to perform the operation. One partial multiply instruction can be translated into around six target instructions and two extra specific register save and restore instructions. However, one long multiply can be much slower than a short multiply. In addition, a long multiply has register constraints as a specific register usage can cause extra save and restore work. These two aspects can lower the efficiency of translation.

The embodiments of this disclosure divide one long multiply into two short multiplies. It chooses more efficient, eliminates extra specific register save and restore work, and simplifies the register allocation. One source ISA instruction can be translated into six target ISA instructions.

An example Instruction Translation Algorithm for a Partial Long Multiply instruction may be configured as follows:

Input: A sequence of source ISA instruction, denoted as SIA_INST

Output: A sequence of target ISA instruction, denoted as TIA_INST

Algorithm:

```
Begin
    src_long_lh' = zero_extend (src_long_lh, SB_size)
    src_long_hh' = arithmetic_shift_right ( src_long_hh, SB_size)
    lh_product = imul (src_long_lh', src_short)
    hh_product = imul (src_long_hh', src_short)
    lh_product' = arithmetic_shift_righ (lh_product, SB_size)
    dest = add (lh_product', hh_product)
    If the current instruction is with extension
        dest = add (dest, src_ext)
    Endif
End
```

Note that in certain example implementations, the binary translation functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., FPGA, EPROM, EEPROM) or an ASIC that includes digital logic, software, code, electronic instructions, or any suitable combination thereof.

In one example implementation, the binary translation systems may include software in order to achieve the binary translation activities outlined herein. The binary translation systems can include memory elements for storing information to be used in achieving the binary translation activities, as discussed herein. Additionally, the binary translation systems may include a processor that can execute software or an algorithm to perform the binary translation activities, as disclosed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any of the memory items discussed herein (e.g., databases, tables, trees, caches, etc.) should be construed as being encompassed within the broad term 'memory element.' Similarly, any of the potential processing elements, modules, and machines described in this Specification should be construed as being encompassed within the broad term 'processor.'

Note that with the example provided above, as well as numerous other examples provided herein, interaction might be described in terms of two, three, or four elements. However, this has been done for purposes of clarity and example only. In certain cases, it may be easier to describe one or more of the functionalities of a given set of flows by only referencing a limited number of elements. It should be appreciated that the binary translation systems (and their teachings) are readily scalable and can accommodate a large number of components, as well as more complicated/sophisticated arrangements and configurations. Accordingly, the examples provided should not limit the scope or inhibit the broad teachings of the binary translation systems as potentially applied to a myriad of other architectures.

It is also important to note that the operations in the preceding flow diagrams illustrate only some of the possible scenarios and patterns that may be executed by, or within, a binary translation system. Some of these operations may be deleted or removed where appropriate, or may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. A binary translation system provides substantial flexibility in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure.

The following examples pertain to embodiments in accordance with this Specification. One or more embodiments may provide a method for performing binary translation. The method may include: translating, by a translator module executing on a processor, source instructions to target instructions; identifying a condition code block in the source instructions, wherein the condition code block includes a plurality of condition bits; and transforming the condition code block, wherein the transforming includes performing a pre-execution on the condition code block to resolve the plurality of condition bits in the condition code block to form a pre-resolved condition set.

In an example of one or more embodiments, the method may further include encoding the source instructions with the pre-resolved condition set.

One or more embodiments may provide a method for performing binary translation. The method may include: identifying, by a runtime environment module executing on a processor, an interrupt at an instruction in the target instructions; retrieving a target address of the interrupted instruction, wherein the target address is for a target instruction set architecture; and identifying a source address of the interrupted instruction in a recovery table, wherein the target address is paired to the source address in the recovery table.

In an example of one or more embodiments, the identifying the source address may include: identifying an offset for the source address of the interrupted instruction in the recovery table, wherein the offset is multiplied by an instruction size of the interrupted instruction; identifying an initial condition state at the source address; setting a current condition state to the initial condition state; advancing the current condition state a number of times based on a value of the offset; and recovering the current condition state.

In another example of one or more embodiments, the advancing the current condition state may include: setting a variable to 1; determining whether the offset is equal to the variable; responsive to the offset equaling the variable, recovering the current condition state; responsive to the offset not equaling the variable, advancing the condition state of the condition code block; responsive to advancing the condition state, setting the current condition state to match the advanced condition state; responsive to setting the current condition state, advancing the variable; and repeating the determining whether the offset is equal to the variable until the offset is equal to the variable.

One or more embodiments may provide a method for translating a parallel multiply addition instruction. The method may include: receiving, by a translator module executing on a processor, an instruction to be translated, wherein the instruction calls for a parallel multiply addition function for a number of source vectors; and generating translated code to perform: executing the parallel multiply addition function for the number of source vectors; and determining whether there is an overflow.

In an example of one or more embodiments, the method may further include: responsive to determining an overflow, setting an overflow flag to indicate there is overflow.

One or more embodiments may provide a method for translating a parallel multiply subtraction instruction. The method may include: receiving, by a translator module executing on a processor, an instruction to be translated, wherein the instruction calls for a parallel multiply subtraction function for a plurality of source vectors, wherein each vector of the plurality of source vectors has a low element and a high element; and generating translated code to perform: performing a bitwise-not operation on a low element of a second source vector; executing the parallel multiply addition function for the plurality of source vectors to form a result; adding a low element of the first source vector to the result; determining whether there is an overflow; responsive to determining an overflow, setting the result to a constant value.

In an example of one or more embodiments, the method may further include: responsive to not determining an overflow, determining whether the high elements were subtracted from the low elements; and responsive to the high elements being subtracted from the low elements, performing a bitwise-not operation on the result.

One or more embodiments may provide a method for translating a partial long multiply instruction. The method may include: receiving, by a translator module executing on a processor, an instruction to be translated, wherein the instruction calls for a partial long multiply function for a plurality of source vectors, and wherein the partial long multiply function has a first operand; and generating translated code to perform: splitting the first operand of the function into an upper half and a lower half; multiplying each half of the first operand with a second operand to form an upper half product and a lower half product; and adding the upper half product to the lower half product.

In an example of one or more embodiments, the splitting the first operand of the function may include: performing a zero-extend operation on the lower half; and performing an arithmetic shift right operation on the upper half.

In another example of one or more embodiments, the method may also include: performing an arithmetic shift right operation on the lower half product.

One or more embodiments may provide at least one computer-readable medium comprising one or more instructions that when executed by a processor: translate source instructions to target instructions; identify a condition code block in the source instructions, wherein the condition code block includes a plurality of condition bits; and transform the condition code block, wherein the transforming includes performing a pre-execution on the condition code block to resolve the plurality of condition bits in the condition code block to form a pre-resolved condition set.

In an example of one or more embodiments, the at least one computer-readable medium may include further instructions that when executed by the processor: encode the source instructions with the pre-resolved condition set.

One or more embodiments may provide at least one computer-readable medium comprising one or more instructions that when executed by a processor: identify an interrupt at an instruction in target instructions; retrieve a target address of the interrupted instruction, wherein the target address is for a target instruction set architecture; and identify a source address of the interrupted instruction in a recovery table, wherein the target address is paired to the source address in the recovery table.

In an example of one or more embodiments of the at least one computer-readable medium, the identifying the source address may include one or more instructions that when executed by the processor: identify an offset for the source address of the interrupted instruction in the recovery table, wherein the offset is multiplied by an instruction size of the interrupted instruction; identify an initial condition state at the source address; set a current condition state to the initial condition state; advance the current condition state a number of times based on a value of the offset; and recover the current condition state.

In another example of one or more embodiments of the at least one computer-readable medium, the advancing the current condition state may include one or more instructions that when executed by the processor: set a variable to 1; determine whether the offset is equal to the variable; responsive to the offset equaling the variable, recover the current condition state; responsive to the offset not equaling the variable, advance the condition state of the condition code block; responsive to advancing the condition state, set the current condition state to match the advanced condition state; responsive to setting the current condition state, advance the variable; and repeat determining whether the offset is equal to the variable until the offset is equal to the variable.

One or more embodiments may provide at least one computer-readable medium comprising one or more instructions that when executed by a processor: receive an instruction to be translated, wherein the instruction calls for a parallel multiply addition function for a number of source vectors; and generate translated code to: execute the parallel multiply addition function for the number of source vectors; and determine whether there is an overflow.

In an example of one or more embodiments, the at least one computer-readable medium may include further instructions that when executed by the processor: responsive to determining an overflow, set an overflow flag to indicate there is overflow.

One or more embodiments may provide at least one computer-readable medium comprising one or more instructions that when executed by a processor: receive an instruction to be translated, wherein the instruction calls for a parallel multiply subtraction function for a plurality of source vectors, wherein each vector of the plurality of source vectors has a low element and a high element; and generate translated code to: perform a bitwise-not operation on a low element of a second source vector; execute the parallel multiply addition function for the plurality of source vectors to form a result; add a low element of the first source vector to the result; determine whether there is an overflow; and responsive to determining an overflow, set the result to a constant value.

In an example of one or more embodiments, the at least one computer-readable medium may include further instructions that when executed by the processor: responsive to not determining an overflow, determine whether the high elements were subtracted from the low elements; and responsive to the high elements being subtracted from the low elements, perform a bitwise-not operation on the result.

One or more embodiments may provide at least one computer-readable medium comprising one or more instructions that when executed by a processor: receive an instruction to be translated, wherein the instruction calls for a partial long multiply function for a plurality of source vectors, and wherein the partial long multiply function has a first operand; and generate translated code to: split the first operand of the function into an upper half and a lower half; multiply each half of the first operand with a second operand to form an upper half product and a lower half product; and add the upper half product to the lower half product.

In an example of one or more embodiments of the at least one computer-readable medium, the splitting the first operand of the function may include one or more instructions that when executed by the processor: perform a zero-extend operation on the lower half; and perform an arithmetic shift right operation on the upper half.

In another example of one or more embodiments, the at least one computer-readable medium may include further instructions that when executed by the processor: perform an arithmetic shift right operation on the lower half product.

One or more embodiments may provide an apparatus comprising: a translator module configured to: translate source instructions to target instructions; and identify a condition code block in the source instructions, wherein the condition code block includes a plurality of condition bits; and an optimizer module configured to transform the condition code block, wherein the transforming includes performing a pre-execution on the condition code block to resolve the plurality of condition bits in the condition code block to form a pre-resolved condition set.

In an example of one or more embodiments, the optimizer module may be further configured to: encode the source instructions with the pre-resolved condition set.

One or more embodiments may provide an apparatus comprising: a recovery table configured to store a number of target addresses and a number of source addresses; and a runtime environment module configured to: identify an interrupt at an instruction in target instructions; retrieve a target address of the interrupted instruction, wherein the target address is for a target instruction set architecture; and identify a source address of the interrupted instruction in the recovery table, wherein the target address of the number of target addresses is paired to the source address of the number of source addresses in the recovery table.

In an example of one or more embodiments, in the identifying the source address, the runtime environment module may be further configured to: identify an offset for the source address of the interrupted instruction in the recovery table, wherein the offset is multiplied by an instruction size of the interrupted instruction; identify an initial condition state at the source address; set a current condition state to the initial condition state; advance the current condition state a number of times based on a value of the offset; and recover the current condition state.

In another example of one or more embodiments, in the advancing the current condition state, the runtime environment module may be further configured to: set a variable to 1; determine whether the offset is equal to the variable; responsive to the offset equaling the variable, recover the current condition state; responsive to the offset not equaling the variable, advance the condition state of the condition code block; responsive to advancing the condition state, set the current condition state to match the advanced condition state; responsive to setting the current condition state, advance the variable; and repeat determining whether the offset is equal to the variable until the offset is equal to the variable.

One or more embodiments may provide an apparatus comprising: a translator module configured to: receive an instruction to be translated, wherein the instruction calls for a parallel multiply addition function for a number of source vectors; and generate translated code to: execute the parallel multiply addition function for the number of source vectors; and determine whether there is an overflow.

In an example of one or more embodiments, the translator module may be further configured to: responsive to determining an overflow, set an overflow flag to indicate there is overflow.

One or more embodiments may provide an apparatus comprising: a translator module configured to: receive an instruction to be translated, wherein the instruction calls for a parallel multiply subtraction function for a plurality of source vectors, wherein each vector of the plurality of source vectors has a low element and a high element; and generate translated code to: perform a bitwise-not operation on a low element of a second source vector; execute the parallel multiply addition function for the plurality of source vectors to form a result; add a low element of the first source vector to the result; determine whether there is an overflow; and responsive to determining an overflow, set the result to a constant value.

In an example of one or more embodiments, the translator module may be further configured to: responsive to not determining an overflow, determine whether the high elements were subtracted from the low elements; and responsive to the high elements being subtracted from the low elements, perform a bitwise-not operation on the result.

One or more embodiments may provide an apparatus comprising: a translator module configured to: receive an instruction to be translated, wherein the instruction calls for a partial long multiply function for a plurality of source vectors, and wherein the partial long multiply function has a first operand; and generate translated code to: split the first operand of the function into an upper half and a lower half; multiply each half of the first operand with a second operand to form an upper half product and a lower half product; and add the upper half product to the lower half product.

In an example of one or more embodiments, in the splitting the first operand of the function, the translator module may be configured to: perform a zero-extend operation on the lower half; and perform an arithmetic shift right operation on the upper half.

In an example of one or more embodiments, the translator module may be further configured to: perform an arithmetic shift right operation on the lower half product.

What is claimed is:

1. A method for performing binary translation, comprising:
    identifying a hot code trace in a source binary application being interpreted by an interpreter module, wherein the identifying is based, at least in part, on determining a frequency of execution of the hot code trace;
    performing a translation of one or more source instructions of the hot code trace to target instructions;
    invoking, by a translator module loaded in system memory, an optimizer module based on identifying a condition code block in the hot code trace, wherein the condition code block includes a plurality of condition bits, and wherein the optimizer module is loaded in system memory and executed by a processor to transform the condition code block into a transformed code by:
        decoding the condition bits on a conditions-specifying instruction of the condition code block;
        statically advancing a condition state and resolving the condition bits on each instruction following the conditions-specifying instruction to form a pre-resolved condition set;
        removing the conditions-specifying instruction; and
        encoding the one or more source instructions of the hot code trace with the pre-resolved condition set.

2. The method of claim 1, wherein the translator module, based on identifying the hot code trace, performs the translation of the one or more source instructions of the hot code trace, wherein the optimizer module is invoked during the translation.

3. The method of claim 1, further comprising:
    receiving, by the translator module, an instruction to be translated, wherein the instruction calls for a parallel multiply addition function for a number of source vectors; and generating translated code to perform:
executing the parallel multiply addition function for the number of source vectors; and
determining whether there is an overflow.

4. The method of claim 3, further comprising:
responsive to determining an overflow, setting an overflow flag to indicate there is overflow.

5. The method of claim 1, further comprising:
receiving, by the translator module, an instruction to be translated, wherein the instruction calls for a parallel multiply subtraction function for a plurality of source vectors, wherein each vector of the plurality of source vectors has a low element and a high element; and
generating translated code to perform:
performing a bitwise-not operation on a low element of a second source vector;
executing the parallel multiply addition function for the plurality of source vectors to form a result;
adding a low element of the first source vector to the result;
determining whether there is an overflow; and
responsive to determining an overflow, setting the result to a constant value.

6. The method of claim 5, further comprising:
responsive to not determining an overflow, determining whether the high elements were subtracted from the low elements; and
responsive to the high elements being subtracted from the low elements, performing a bitwise-not operation on the result.

7. The method of claim 1, further comprising:
receiving, by the translator module, an instruction to be translated, wherein the instruction calls for a partial long multiply function for a plurality of source vectors, and wherein the partial long multiply function has a first operand; and
generating translated code to perform:
splitting the first operand of the function into an upper half and a lower half;
multiplying each half of the first operand with a second operand to form an upper half product and a lower half product; and
adding the upper half product to the lower half product.

8. The method of claim 7, wherein the splitting the first operand of the function comprises:
performing a zero-extend operation on the lower half; and
performing an arithmetic shift right operation on the upper half.

9. The method of claim 7, further comprising:
performing an arithmetic shift right operation on the lower half product.

10. At least one non-transitory computer-readable medium comprising one or more instructions that when executed by a processor:
identify a hot code trace in a source binary application being interpreted, wherein the identifying is based, at least in part, on determining a frequency of execution of the hot code trace;
perform a translation of one or more source instructions of the hot code trace to target instructions;
identify a condition code block in the hot code trace, wherein the condition code block includes a plurality of condition bits; and
transform the condition code block into a transformed code, wherein the transforming includes:
decoding the condition bits on a conditions-specifying instruction of the condition code block;
statically advancing a condition state and resolving the condition bits on each instruction following the conditions-specifying instruction to form a pre-resolved condition set;
removing the conditions-specifying instruction; and
encoding the one or more source instructions of the hot code trace with the pre-resolved condition set.

11. The at least one non-transitory computer-readable medium of claim 10, further comprising one or more instructions that when executed by the processor:
perform the translation, based on identifying the hot code trace, wherein the condition code block is transformed into the transformed code during the translation.

12. The at least one non-transitory computer-readable medium of claim 10, further comprising one or more instructions that when executed by the processor:
receive an instruction to be translated, wherein the instruction calls for a parallel multiply addition function for a number of source vectors; and
generate translated code to:
execute the parallel multiply addition function for the number of source vectors; and
determine whether there is an overflow.

13. The at least one non-transitory computer-readable medium of claim 12, further comprising one or more instructions that when executed by the processor:
responsive to determining an overflow, set an overflow flag to indicate there is overflow.

14. The at least one non-transitory computer-readable medium of claim 10, further comprising one or more instructions that when executed by the processor:
receive an instruction to be translated, wherein the instruction calls for a parallel multiply subtraction function for a plurality of source vectors, wherein each vector of the plurality of source vectors has a low element and a high element; and
generate translated code to:
perform a bitwise-not operation on a low element of a second source vector;
execute the parallel multiply addition function for the plurality of source vectors to form a result;
add a low element of the first source vector to the result;
determine whether there is an overflow; and
responsive to determining an overflow, set the result to a constant value.

15. The at least one non-transitory computer-readable medium of claim 14, further comprising one or more instructions that when executed by the processor:
responsive to not determining an overflow, determine whether the high elements were subtracted from the low elements; and
responsive to the high elements being subtracted from the low elements, perform a bitwise-not operation on the result.

16. The at least one non-transitory computer-readable medium of claim 10, further comprising one or more instructions that when executed by the processor:
receive an instruction to be translated, wherein the instruction calls for a partial long multiply function for a plurality of source vectors, and wherein the partial long multiply function has a first operand; and
generate translated code to:
split the first operand of the function into an upper half and a lower half;
multiply each half of the first operand with a second operand to form an upper half product and a lower half product; and
add the upper half product to the lower half product.

17. The at least one non-transitory computer-readable medium of claim 16, wherein the splitting the first operand of the function comprises one or more instructions that when executed by the processor:
  perform a zero-extend operation on the lower half; and
  perform an arithmetic shift right operation on the upper half.

18. The at least one non-transitory computer-readable medium of claim 16, further comprising one or more instructions that when executed by the processor:
  perform an arithmetic shift right operation on the lower half product.

* * * * *